(12) United States Patent
Kanenari (10) Patent No.: US 8,789,412 B2
(45) Date of Patent: Jul. 29, 2014

(54) TRANSMISSION DEVICE FOR TRANSMITTING INFORMATION ABOUT TIRE CONDITION AND TIRE CONDITION MONITORING SYSTEM

(75) Inventor: Daisuke Kanenari, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 190 days.

(21) Appl. No.: 13/511,234

(22) PCT Filed: Nov. 24, 2010

(86) PCT No.: PCT/JP2010/006854
§ 371 (c)(1),
(2), (4) Date: May 22, 2012

(87) PCT Pub. No.: WO2011/064991
PCT Pub. Date: Jun. 3, 2011

(65) Prior Publication Data
US 2012/0229266 A1    Sep. 13, 2012

(30) Foreign Application Priority Data

Nov. 30, 2009  (JP) ................................ 2009-270924

(51) Int. Cl.
*B60C 23/02* (2006.01)
*B60C 23/00* (2006.01)

(52) U.S. Cl.
USPC ......................... 73/146.2; 340/442; 340/445

(58) Field of Classification Search
USPC ................................ 73/146–146.8
See application file for complete search history.

(56) References Cited

U.S. PATENT DOCUMENTS

| 7,281,421 B2 * | 10/2007 | Yin et al. | 73/146.8 |
| 7,538,660 B2 * | 5/2009 | Murakami | 340/442 |
| 2002/0166371 A1 * | 11/2002 | Ratti et al. | 73/146 |
| 2003/0000297 A1 * | 1/2003 | Ito et al. | 73/146 |

(Continued)

FOREIGN PATENT DOCUMENTS

| CN | 1578746 A | 2/2005 |
| CN | 2887115 Y | 4/2007 |

(Continued)

OTHER PUBLICATIONS

International Search Report of corresponding International Application No. PCT/JP2010/006854, dated on Feb. 16, 2011.

(Continued)

*Primary Examiner* — Andre Allen
(74) *Attorney, Agent, or Firm* — Global IP Counselors, LLP (57) ABSTRACT

A tire condition monitoring system includes a transmission device, a receiving device, and a monitoring section. The transmitting device includes a sensor which detects, as tire information, a condition of gas in the tire cavity area surrounded with a tire and a rim, a transmitter which wirelessly transmits the tire information, and a housing having a wall surrounding the sensor and the transmitter and separating an inner space from the tire cavity area. The housing wall defines a communicating through hole which enables communication between the cavity area and inner space and a selectively non-communicating through hole having a member which is movable between blocking and unblocking positions to impede and enable communication, respectively, between the cavity area and inner space. The receiving device receives the tire information, and the monitoring section determines whether a tire anomaly exists based on the tire information and provides a result.

20 Claims, 10 Drawing Sheets

(56) References Cited

U.S. PATENT DOCUMENTS

| | | | |
|---|---|---|---|
| 2003/0154779 A1* | 8/2003 | Polenghi | 73/146.8 |
| 2006/0093015 A1 | 5/2006 | Ichihara et al. | |
| 2010/0024539 A1 | 2/2010 | Hamm et al. | |
| 2011/0043354 A1* | 2/2011 | Shepler et al. | 340/447 |
| 2012/0222478 A1* | 9/2012 | Kanenari et al. | 73/146.5 |
| 2012/0234086 A1* | 9/2012 | Kanenari | 73/146 |
| 2013/0298658 A1* | 11/2013 | Kanenari | 73/146.4 |

FOREIGN PATENT DOCUMENTS

| | | |
|---|---|---|
| CN | 101138940 A | 3/2008 |
| EP | 0 985 560 A2 | 3/2000 |
| FR | 2 884 610 A1 | 10/2006 |
| JP | 2006-074351 A | 3/2006 |
| JP | 2007-196834 A | 8/2007 |
| JP | 2008-062730 A | 3/2008 |
| WO | WO-2004/014671 A1 | 2/2004 |
| WO | WO-2008/133314 A1 | 11/2008 |

OTHER PUBLICATIONS

Japanese Office Action of the corresponding Japanese Application No. 2009-270924, dated May 18, 2010.

Chinese Office Action of the corresponding Chinese Application No. 2010800465441, dated Mar. 31, 2014.

* cited by examiner

PEEL OFF ONE SHEET AFTER PUNCTURE REPAIR — 37

TRANSMISSION DEVICE FOR TRANSMITTING INFORMATION ABOUT TIRE CONDITION AND TIRE CONDITION MONITORING SYSTEM

CROSS-REFERENCE TO RELATED APPLICATIONS

This U.S. National stage application claims priority under 35 U.S.C. §119(a) to Japanese Patent Application No. 2009-270924, filed in Japan on Nov. 30, 2009, the entire contents of Japanese Patent Application No. 2009-270924 are hereby incorporated herein by reference.

BACKGROUND

1. Field of the Invention

The present invention relates to a transmission device provided in a tire cavity area to transmit tire information about a tire condition and a tire condition monitoring system for determining whether a tire anomaly is caused.

2. Background Information

Conventionally, a check and control of air pressure of a tire mounted to a vehicle are desired for improvement of tire durability, improvement of wear resistance, improvement of fuel economy, or improvement of ride quality, and improvement of handling performance. For this purpose, various systems for monitoring tire pressure have been proposed. In such a system, in general, information about the air pressure of the tire mounted to a wheel is detected, a transmission device for transmitting the information is provided in a tire cavity area of each wheel, and the information of the air pressure of each tire is obtained from the transmission device to monitor the air pressure of the tire.

On the other hand, when a tire goes flat, a puncture repair agent to be injected into a tire cavity area located between the tire and a rim is often used. Because the puncture repair agent is a liquid, the agent adheres to the transmission device provided in the tire cavity area as well as a tire inner surface facing the tire cavity area when the agent is injected into the tire cavity area. In some cases, the agent becomes solidified to close an opening portion formed in the transmission device to affect measurement of the air pressure.

To cope with this problem, a wheel condition detection device capable of maintaining a normal detection condition by preventing entry of foreign matter through a communication portion for detection has been proposed (Japanese Patent Application Laid-Open No. 2008-62730).

To put it concretely, a TPMS (Tire Pressure Monitoring System) valve of the wheel condition detection device is provided with a communication portion opening and closing mechanism for opening and closing a communication hole formed in a housing. At the time of puncture repair, entry of the puncture repair agent into a detection space through the communication hole is prevented. This communication portion opening and closing mechanism is made up of mechanical bodies including a lid body and a torsion coil spring and automatically opens and closes the communication hole by centrifugal force acting on a wheel.

Moreover, there are proposed a tire pressure monitoring system and a tire pressure sensor unit for informing an occupant that tire pressure may drop after a punctured tire is fixed by using a tire puncture repair agent (Japanese Patent Application Laid-Open No. 2007-196834).

To put it concretely, the tire pressure monitoring system is provided to each tire of a vehicle and is provided with a sensor unit having a tire pressure sensor and a transmitter, a receiving device for receiving a radio wave from the sensor unit, and a control ECU for giving an alarm when the air pressure of each tire becomes lower than or equal to a threshold value. The system is provided with a puncture determination means for determining puncture of each tire and a puncture repair agent use determination means for determining whether or not the punctured tire was repaired by using the puncture repair agent after it was determined that the tire blew out. When it was determined that the punctured tire was repaired by using the puncture repair agent, the control ECU continues the alarm even if the tire pressure value from the air pressure sensor is a normal value.

Because the communication portion opening and closing mechanism of the device described in Japanese Patent Application Laid-Open No. 2008-62730 is made up of the mechanical bodies including the lid body and the torsion coil spring, the device itself is complicated and expensive. In the system and the unit described in Japanese Patent Application Laid-Open No. 2007-196834, it is not certain whether or not the information about the tire pressure measured after the repair of the tire by using the puncture repair agent is correct. Therefore, it is impossible to determine whether a tire anomaly after the puncture repair is caused.

SUMMARY

Therefore, an object of the present invention is to provide a transmission device capable of appropriately detecting and transmitting tire information such as tire pressure information even after tire puncture repair by using a puncture repair agent and a tire condition monitoring system for determining whether a tire anomaly is caused.

According to a first aspect of the invention, there is provided with a transmitting device provided in a tire cavity area to transmit tire information about a condition of a tire. The device includes: a sensor which detects, as the tire information, a condition of gas filled in the tire cavity area surrounded with the tire and a rim;
a transmitter which wirelessly transmits the detected tire information; and
a housing which has a wall surrounding the sensor and the transmitter, and an inner space separated from the tire cavity area by the wall.

The housing is provided with a plurality of through holes passing through the wall. The through holes include a non-communicating through hole which is out of communication between the tire cavity area and the inner space in the housing by blockage of a member, and a communicating through hole which is in communication between the tire cavity area and the inner space in the housing. The non-communicating through hole is made communicative between the tire cavity area and the inner space in the housing when the member is removed.

According to a second aspect of the invention, there is provided with a transmitting device provided in a tire cavity area to transmit tire information about a condition of a tire. The device includes:
a sensor which detects, as the tire information, a condition of gas filled in the tire cavity area surrounded with the tire and a rim;
a transmitter which wirelessly transmits the detected tire information; and
a housing which has a wall surrounding the sensor and the transmitter, and an inner space separated from the tire cavity area by the wall.

The housing is provided with at least one through hole passing through the wall of the housing in order to connect the inner space and the tire cavity area and is further provided with means for forming a through hole, the means including a protrusion which protrudes from a face of the housing and a thin-walled portion which is formed in a position corresponding to a position of the protrusion on an opposite side of the wall of the housing from the protrusion and has a smaller wall thickness than a portion around the thin-walled portion. Then, a new through hole is formed in the position of the thin-walled portion by breaking off the protrusion.

According to a third aspect of the invention, there is provided with a tire condition monitoring system. The system includes a transmitting device; a receiving device; and a monitoring section. The transmitting device includes
a sensor which detects, as tire information, a condition of gas filled in the tire cavity area surrounded with a tire and a rim,
a transmitter which wirelessly transmits the detected tire information, and
a housing which has a wall surrounding the sensor and the transmitter, and an inner space separated from the tire cavity area by the wall,
the housing is provided with a plurality of through holes passing through the wall.

The through holes include a non-communicating through hole which is out of communication between the tire cavity area and the inner space in the housing by blockage of a member, and a communicating through hole which is in communication between the tire cavity area and the inner space in the housing. The non-communicating through hole is made communicative between the tire cavity area and the inner space in the housing when the member is removed. The receiving device receives the tire information transmitted from the transmitter. The monitoring section determines whether a tire anomaly is caused based on the tire information and informs a determination result.

According to a fourth aspect of the invention, there is provided with a tire condition monitoring system. The system includes a transmitting device; a receiving device; and a monitoring section. The transmitting device includes
a sensor which detects, as tire information, a condition of gas filled in the tire cavity area surrounded with the tire and a rim;
a transmitter which wirelessly transmits the detected tire information; and
a housing which has a wall surrounding the sensor and the transmitter, and an inner space separated from the tire cavity area by the wall.

The housing is provided with at least one through hole passing through the wall of the housing in order to connect the inner space and the tire cavity area and is further provided with means for forming a through hole. The means includes a protrusion which protrudes from a face of the housing and a thin-walled portion which is formed in a position corresponding to a position of the protrusion on an opposite side of the wall of the housing from the protrusion and has a smaller wall thickness than a portion around the thin-walled portion. Then, a new through hole is formed in the position of the thin-walled portion by breaking off the protrusion.

The receiving device receives the tire information transmitted from the transmitter. The monitoring section determines whether tire anomaly is caused based on the tire information and informs a determination result.

DETAILED DESCRIPTION OF EMBODIMENTS

A transmission device and a tire condition monitoring system of the present invention will be described below in detail.

Figure 1:
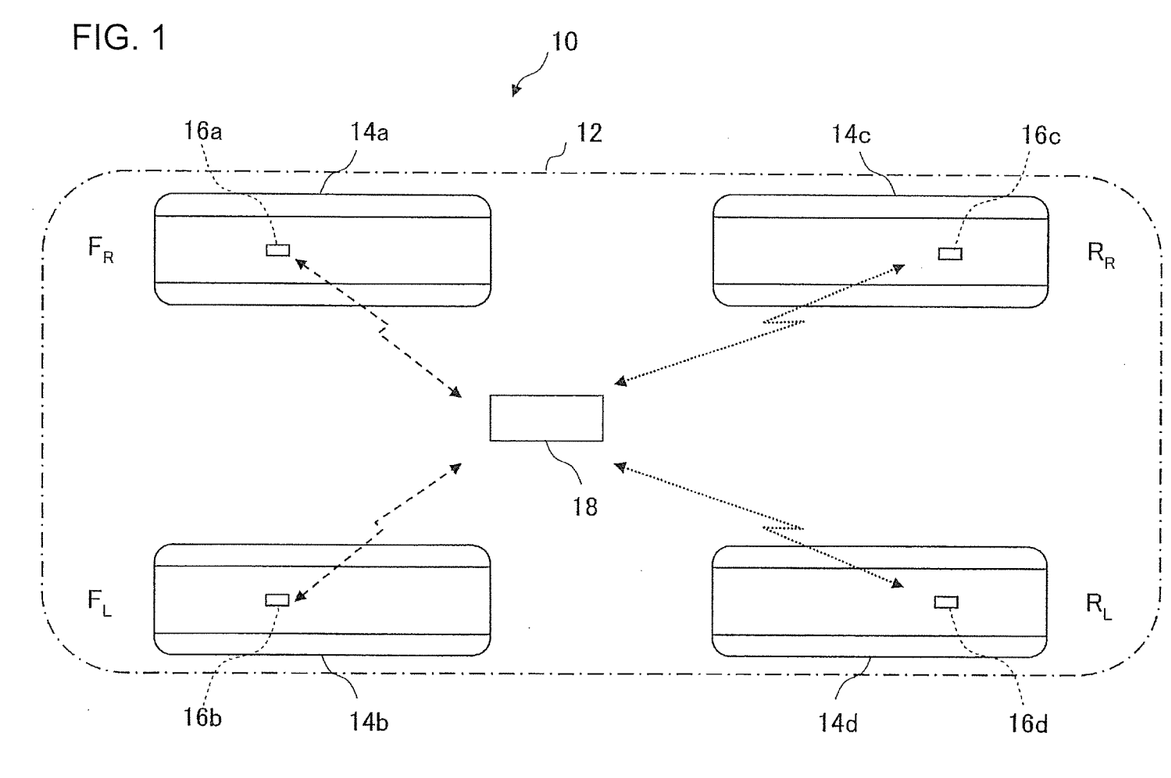
FIG. 1 is a general overview diagram of a tire pressure monitoring system which is a first embodiment of a tire condition monitoring system.

FIG. 1 is a general overview diagram of a tire pressure monitoring system 10 which is an embodiment of the tire condition monitoring system.

The tire pressure monitoring system (hereafter referred to as "system") 10 is mounted on a vehicle 12. The system 10 includes air pressure information transmission devices (hereafter referred to as "transmission devices") 16a, 16b, 16c, and 16d provided in respective tire cavity areas in tires 14a, 14b, 14c, and 14d of respective wheels of the vehicle 12 and a monitoring device 18.

All of the transmission devices 16a, 16b, 16c, and 16d detect information about pressure of air filled into the tire cavity areas surrounded with the tires and rims as tire information and wirelessly transmit the tire information to the monitoring device 18. Hereafter, to explain all of the transmission devices 16a, 16b, 16c, and 16d at a time, the transmission devices 16a, 16b, 16c, and 16d will be collectively referred to as transmission devices 16.

Figure 2:
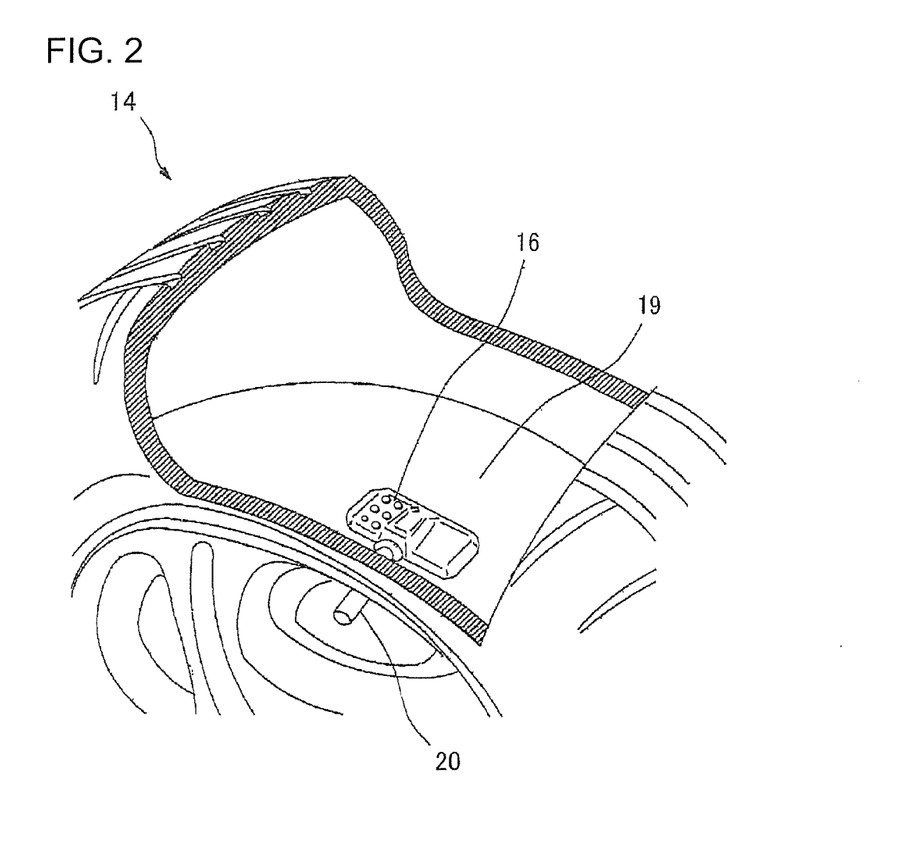
FIG. 2 is a drawing for explaining an example of a method of fixing a transmitting device illustrated in FIG. 1 in a tire cavity area.
Figure 3:
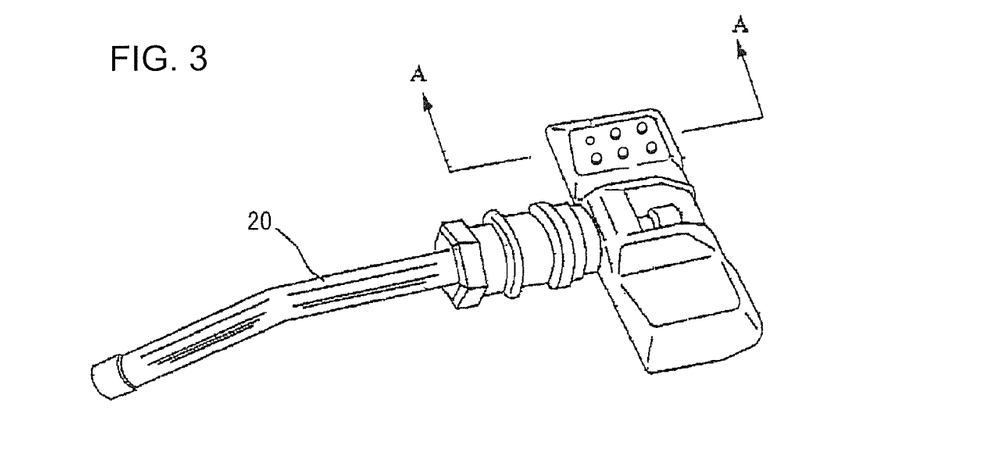
FIG. 3 is a perspective view of an entire device in which the transmitting device illustrated in FIG. 2 is integrated with a tire valve.

FIG. 2 is a drawing for explaining an example of a method for fixing the transmission device 16 in the tire cavity area. FIG. 3 is a perspective view of an entire device in which the transmission device 16 illustrated in FIG. 2 is integrated with a tire valve 20.

The transmission device 16 is provided to an end portion of the tire valve 20 extending on a side of the tire cavity area and is fixed and disposed in the tire cavity area by mechanically fixing the tire valve 20 to the rim 19.

Figure 4:
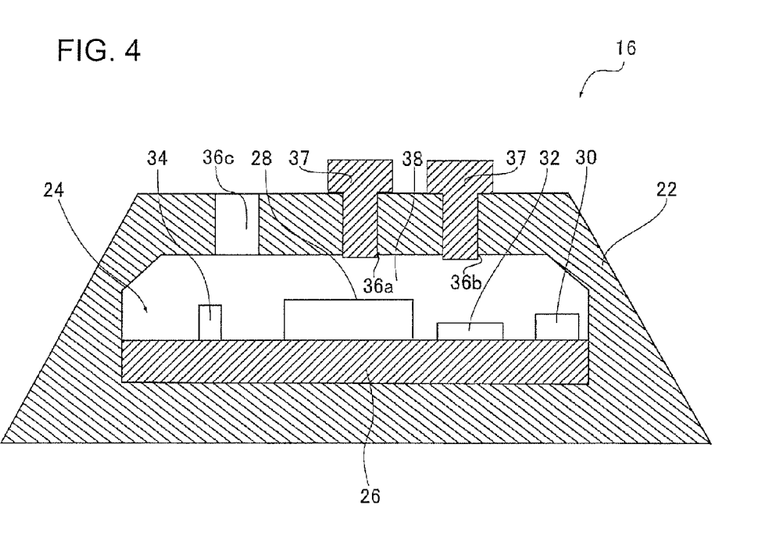
FIG. 4 is a sectional view of the transmitting device taken along a direction of arrows A-A illustrated in FIG. 3.

FIG. 4 is a sectional view of the transmission device 16 along a line of A-A illustrated in FIG. 3. As illustrated in FIG. 4, the transmission device 16 includes a housing 22 and a circuit 24 provided in the housing 22. The housing 22 includes a wall surrounding the circuit 24 and an inner space 38 separated from the tire cavity area by the wall. The circuit 24 includes a substrate 26 and a sensor unit 28, a transmitter 30, a processing unit 32, a power supply section 34, and an antenna 40 (see FIG. 5) provided to the substrate 26.

Figure 5:
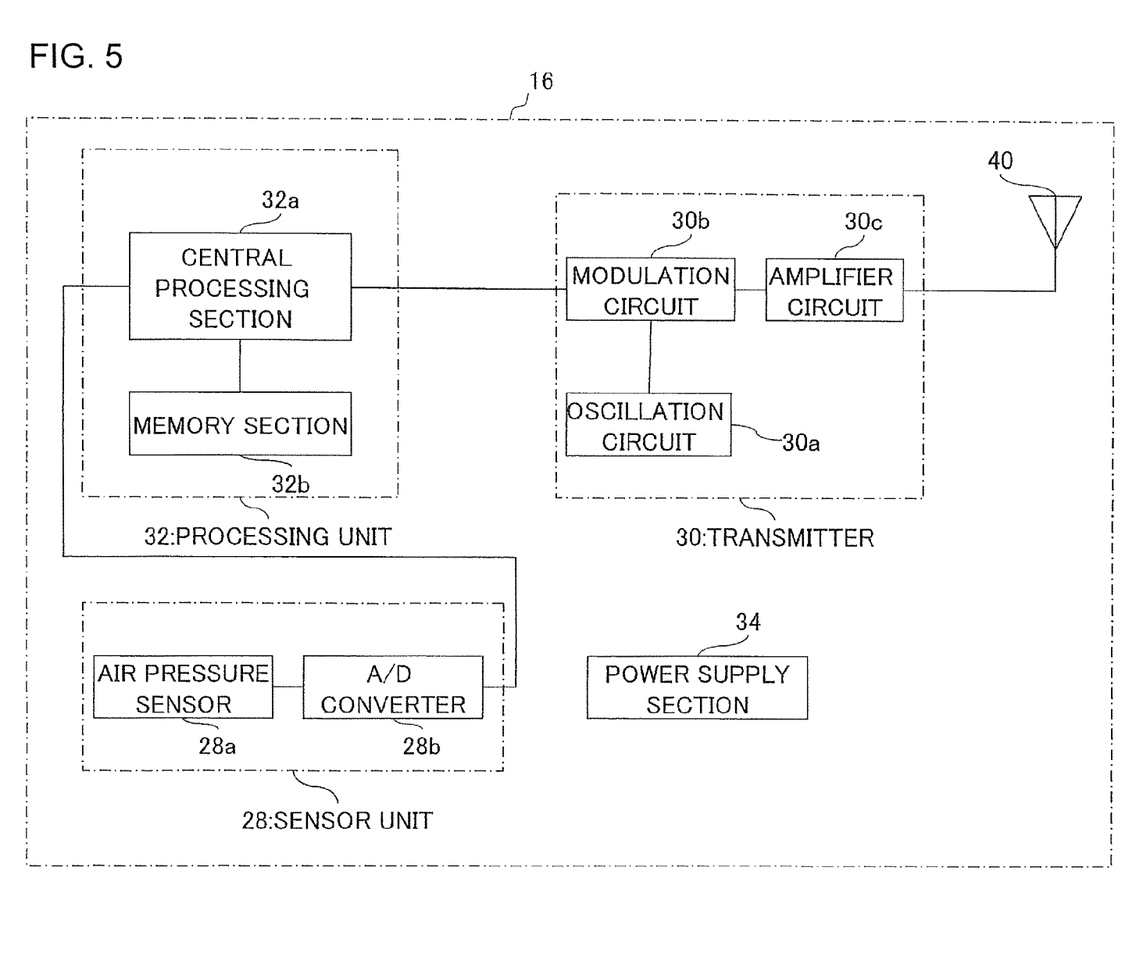
FIG. 5 is a circuit block diagram of the transmitting device illustrated in FIG. 1.

FIG. 5 is a circuit block diagram of the transmitting device 16.

The sensor unit 28 includes an air pressure sensor 28a and an A/D converter 28b. The air pressure sensor 28a senses the air pressure in the inner space 38 in the housing 22 and outputs a pressure signal. The inner space 38 in the housing 22 communicates with the space in the tire cavity area through one through hole 36 out of six through holes 36 passing through the housing 22. The remaining five through holes 36 are closed with members 37 to be non-communicating through holes. In the sectional view in FIG. 4, the through holes 36a, 36b, and 36c are illustrated. Out of the through holes 36a, 36b, and 36c, the through holes 36a and 36b are closed with the members 37 to be the non-communicating through holes and the through hole 36c connects the inner space 38 and the tire cavity area. The six through holes are collectively referred to as through holes 36.

The A/D converter 28b carries out digital conversion of the pressure signal output from the air pressure sensor 28a and outputs pressure data.

The processing unit 32 includes a central processing section 32a and a memory section 32b. The central processing section 32a operates based on a program stored in a semiconductor memory of the memory section 32b. When the central processing section 32a is powered and driven, it carries out control so that the pressure data, which is information about the air pressure and sent from the sensor unit 28, is transmitted to the monitoring device 18 via the transmitter 30 at predetermined time intervals, e.g., every five minutes. Identification information unique to the transmission device 16 is stored in advance in the memory section 32b and the central processing section 32a carries out control so that the identification information is transmitted to the monitoring device 18 together with the pressure data.

The memory section 32b includes a ROM for storing the program for operation of the central processing section 32a and rewritable nonvolatile memory such as an EEPROM. The identification information unique to the transmission device 16 is stored in an unwritable area in the memory section 32b.

The transmitter 30 includes an oscillation circuit 30a, a modulation circuit 30b, and an amplifier circuit 30c.

The oscillation circuit 30a generates a carrier signal, e.g., an RF signal belonging to a 315 MHz frequency band.

The modulation circuit 30b modulates the carrier signal by using the pressure data sent from the central processing section 32a and the identification information unique to the transmission device 16 to generate a transmitting signal. As a modulation method, a method such as amplitude shift keying (ASK), frequency modulation (FM), frequency shift keying (FSK), phase modulation (PM), and phase shift keying (PSK) can be used.

The amplifier circuit 30c amplifies the transmitting signal generated by the modulation circuit 30b and wirelessly transmits the transmitting signal to the monitoring device 18 via the antenna 40.

A secondary battery, for example, is used as the power supply section 34 to almost permanently supply electric power to the sensor unit 28, the transmitter 30, and the processing unit 32.

As described above, the six through holes 36 passing through a wall of the housing 22 are formed in the surface of the housing 22 which covers the circuit 24 as illustrated in FIG. 3. As the through holes 36, the three through holes 36a, 36b, and 36c are illustrated in FIG. 4. Out of the through holes 36a, 36b, and 36c, the through holes 36a and 36b are closed with the members 37. In other words, through the two through holes 36a and 36b, the tire cavity area and the inner space 38 in the housing 22 are separated from each other by the members 37 locked in the through holes 36. Through the one through hole 36c not provided with the member 37, the tire cavity area and the inner space 38 in the housing 22 communicate with each other. The member 37 has a columnar portion having substantially the same diameter as a hole diameter of the through hole 36 and is fixed by means of friction between the columnar portion and an inner peripheral face of the through hole 36.

A purpose of providing the members 37 to some of the plurality of through holes 36 to make them the non-communicating through holes is to make it possible, when the communicating through hole 36 is closed with the puncture repair agent, to newly set a communicating through hole 36 by removing the member 37 provided in the non-communicating through hole. The number of through holes 36 provided with the members 37 and the number of through holes not provided with the members 37 are not especially restricted. However, in order to prevent the puncture repair agent from entering the inner space 38, the number of through holes 36 not provided with the members 37 is preferably one.

An opening area of an opening portion of the through hole 36 in the surface of the housing 22 is preferably 0.4 mm$^2$ or smaller. This is because, even if the puncture repair agent adheres to the opening portion, the puncture repair agent does not enter the through hole 36 due to surface tension and the puncture repair agent attached to the opening portion is highly likely to be removed due to rolling of the tire before the agent solidifies.

The opening areas of the respective opening portions of the through holes 36 need not to be the same. An arrangement of the opening portions is not limited to that in FIG. 3 in which the opening portions are arranged in two parallel rows but may be any arrangement.

Although the transmitting device 16 in the embodiment detects the pressure of the air filled in the tire cavity area as a condition of the tire, the target for the detection may be temperature of the air in the tire cavity area instead of the air pressure.

Moreover, the transmitting device 16 may not be fixed to the tire valve 20 but be fixed directly to an inner surface of the tire and facing the tire cavity area or a surface of the rim 19 and facing the tire cavity area.

Figure 6:
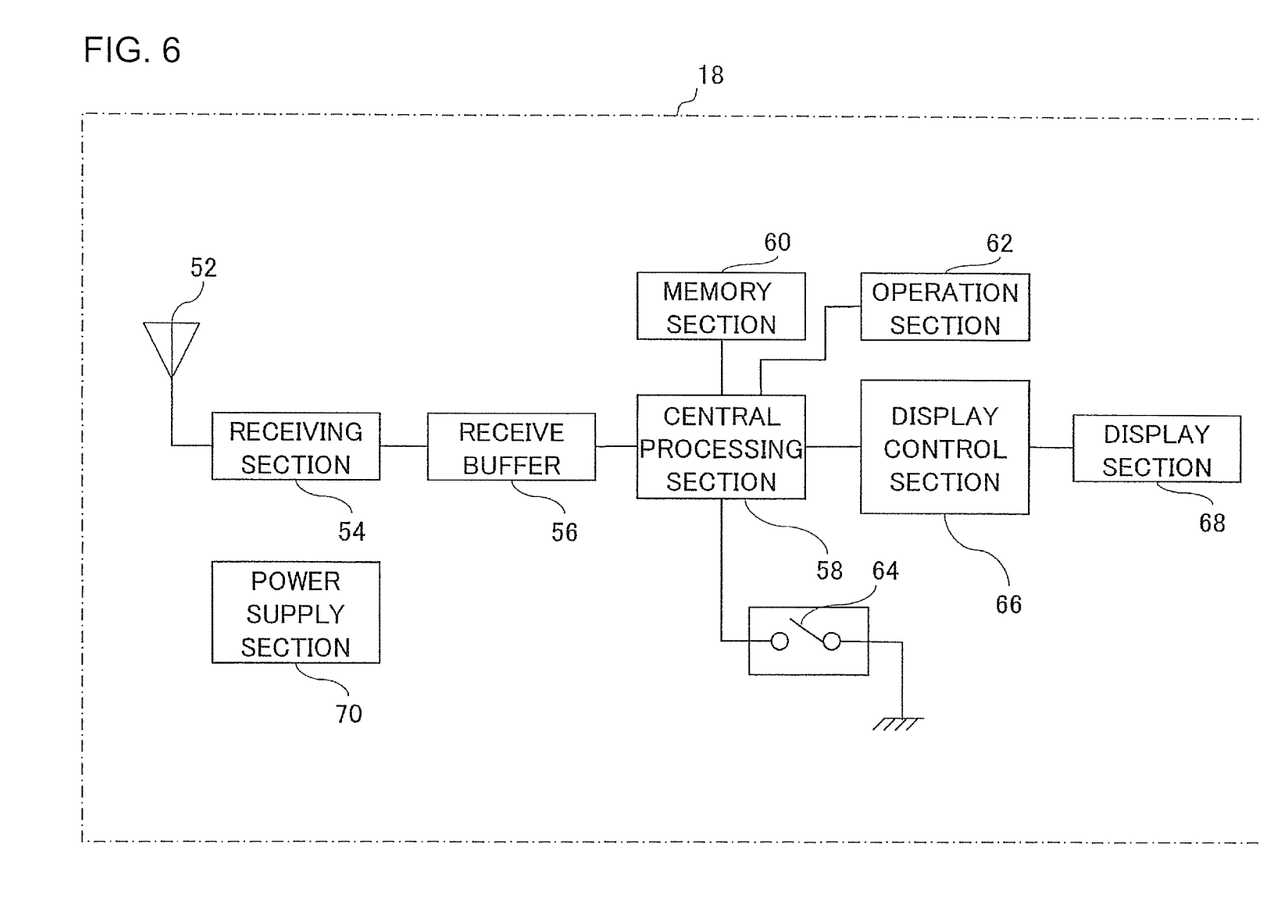
FIG. 6 is a circuit block diagram of a monitoring device illustrated in FIG. 1.

FIG. 6 is a circuit block diagram of the monitoring device 18.

The monitoring device 18 is installed in front of a position of a driver's seat of the vehicle 12, for example, and informs a driver of the information about the air pressure. The monitoring device 18 includes an antenna 52, a receiving section 54, a receive buffer 56, a central processing section 58, a memory section 60, an operation section 62, a switch 64, a display control section 66, a display section 68, and a power supply section 70.

Frequency of the antenna 52 is matched to transmit frequency of the transmission device 16 and the antenna 52 is connected to the receiving section 54.

The receiving section 54 receives the transmitting signal of a predetermined frequency and sent from the transmission device 16 and demodulates the signal to take out the pressure data and the data of the identification information. These pieces of data are output to the receive buffer 56. The receive buffer 56 temporarily stores the pressure data and the data of the identification information output from the receiving section 54. The stored pressure data and the data of the identification information are output to the central processing section 58 according to a direction of the central processing section 58.

The central processing section 58 is mainly made up of a CPU and operates based on a program stored in the memory section 60. The central processing section 58 monitors the air pressure of each of the tires 14a to 14d for each piece of identification information based on the received pressure data and data of the identification information. To put it concretely, the central processing section 58 determines whether a tire anomaly is caused based on the pressure data and informs a determination result. Determination of whether the tire anomaly is caused is to determine whether or not the air pressure dropped to an abnormally low level or dropped sharply in a short period of time to show that the tire blew out, for example.

The central processing section 58 outputs a determination result to the display control section 66 and causes the display section 68 to output the determination result through the display control section 66.

Furthermore, the central processing section 58 initializes a communication method and the like with the transmission device 16 according to information from the operation section 62 and information from the switch 64. Moreover, the central processing section 58 can set determination conditions for determining whether the tire anomaly is caused according to the information from the operation section 62.

The memory section 60 includes a ROM for storing the program for operation of the CPU of the central processing section 58 and a nonvolatile memory such as an EEPROM. A table of the communication method with the transmission device 16 is stored in the memory section 60 during manufacture. The transmission device 16 and the monitoring device 18 communicate with each other by the above-described communication method at an early stage. The communication method table includes information such as a communication protocol, a transmission bit rate, and a data format corresponding to the identification information unique to the transmission device 16. Settings of these pieces of information can be more freely changed by means of input from the operation section 62.

The operation section 62 includes an input device such as a keyboard and is used to input various kinds of information and conditions. The switch 64 is used to direct the central processing section 58 to start initialization.

The display control section 66 controls the display section 68 to display the tire pressure corresponding to the mounted position of the tire according to the determination result from the central processing section 58. At the same time, the display control section 66 carries out control to cause the display section 68 to display also the determination result that the tire has blown out, for example.

The power supply section 70 controls electric power supplied from a battery mounted to the vehicle 12 to suitable voltages and supplies them to respective portions of the monitoring device 18.

The transmission device 16 and the monitoring device 18 are formed as described above.

As above described, some of the through holes 36 passing through the wall of the housing 22 are the non-communicating through holes which are closed by the members 37. Even if the communicating through hole 36c is closed by the tire puncture repair agent, the through hole 36a or 36b can be made a communicating through hole by removing a member 37 provided in one of the non-communicating through holes.

Figure 7:
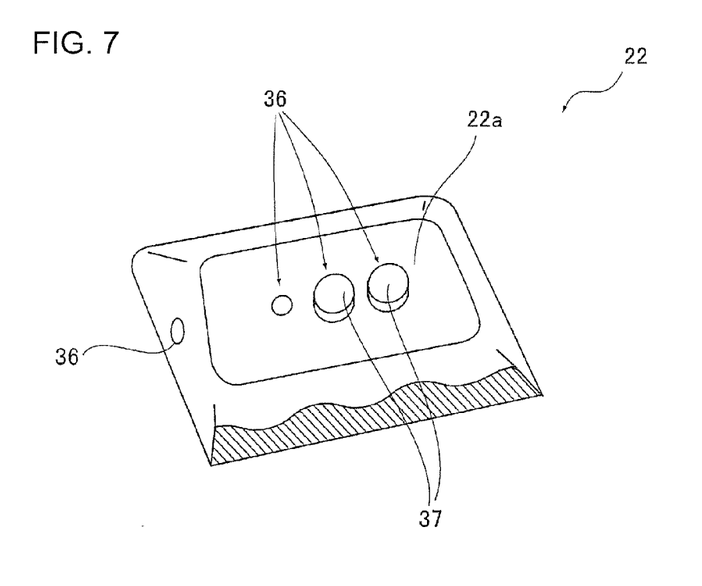
FIG. 7 is a perspective view for explaining another form of transmitting device different from the transmitting device illustrated in FIG. 3.

FIG. 7 is a perspective view illustrating a modification of the transmitting device 16. In the example in FIG. 7, four through holes 36 are provided to the housing 22. The opening portions of the three through holes 36 are formed on a face 22a and the opening portion of the one through hole 36 is formed on a side face oriented in a different direction from the face 22a. The two through holes 36 out of the three through holes 36 having the opening portions formed on the face 22a are closed with the members 37 to be the non-communicating through holes. The remaining one through hole 36 (the left hole on the face 22a in the drawing) is open and the inner space 38 and the tire cavity area communicate with each other through this through hole 36. As described above, the housing 22 has a plurality of faces oriented in different directions from each other in the tire cavity area and the opening portions of the plurality of through holes 36 facing the tire cavity area are formed on the plurality of faces of the housing 22. In this way, even if the puncture repair agent adheres to the opening portion of the through hole on one face, it is highly unlikely that the puncture repair agent adheres to the through hole formed on a different face, which keeps communication between the tire cavity area and the inner space in the housing 22. One or more through holes 36 may be formed on each of the plurality of faces of the housing 22 and the two or more through holes 36 in total may be provided to the housing 22.

It is the more preferable that the opening portions of the plurality of through holes 36 are formed on each of the plurality of faces of the housing 22 in order to keep the communication between the tire cavity area and the inner space 38 in the housing 22. In this housing, some of the opening portions of the through holes 36 formed on each face may be the non-communicating through holes closed with the members 37. Even if a through hole 36 is closed with the puncture repair agent, it is possible to reliably keep the communication between the inner space 38 in the housing 22 and the tire cavity area by using another through hole 36 formed on the same face. Therefore, even if the puncture repair agent is injected into the tire cavity area, the transmitting device 16 can appropriately measure and transmit the correct tire information.

Figure 8:
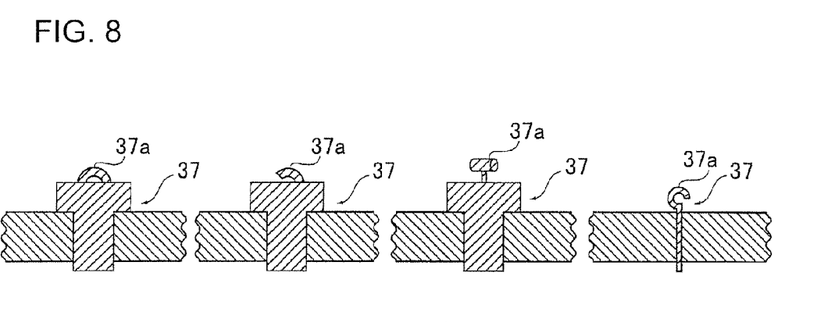
FIG. 8 is a drawing for explaining another form of member used for the transmitting device and different from a member for closing a through hole illustrated in FIG. 4.

FIG. 8 is a drawing which illustrates another embodiment (a second embodiment) of the member 37 for closing the housing 22 having the through holes 36 in the transmitting device 16.

FIG. 8 illustrates examples of the member 37 having assist handles for helping attach and detach the member 37 to and from the non-communicating through hole. To put it concretely, an end portion (head portion) of the detachable member 37 protrudes from the opening portion of the non-communicating through hole when the member 37 is provided to the through hole 36. The protruding end portion (head portion) of the member 37 is provided with the assist handle 37a for help attach and detach the member 37. The assist handle 37a may be of various types as illustrated in FIG. 8. Some types may be a hook shape or an annular shape, for example, so that the member 37 can be easily pulled out of the through hole 36 by using string, wire rod such as wire, or a thin jig after detachment of the tire from the rim. Material of the member 37 may be resin or metal.

Figure 9:
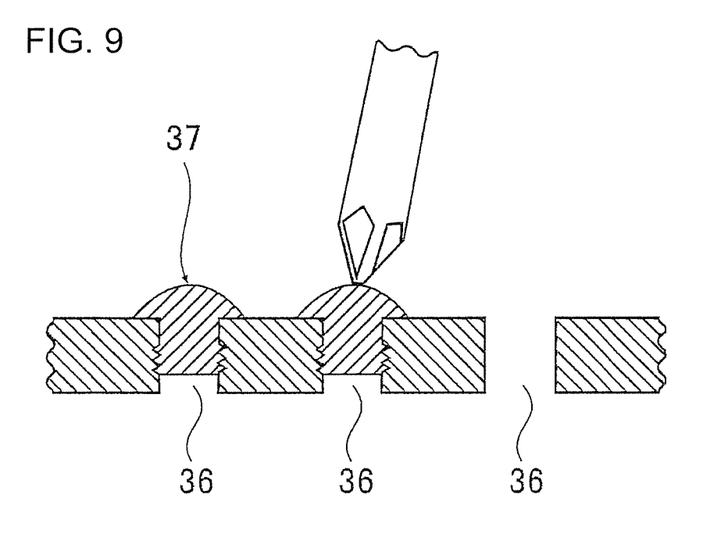
FIG. 9 is a drawing for explaining another example of the member for closing the through hole and used for the transmitting device.

FIG. 9 is a drawing which illustrates a modification of the member 37 in the second embodiment. The member 37 is an external screw, an internal thread is formed in the non-communicating through hole 36, and the member 37 is fixed by being screwed into the through hole 36. By closing the through hole 36 with the external screw, airtightness is increased. Moreover, the member 37 can be removed by unscrewing the external screw with a screwdriver or the like, which improves workability. Furthermore, the external screw is used as the member 37, which reduces cost.

Figure 10A:
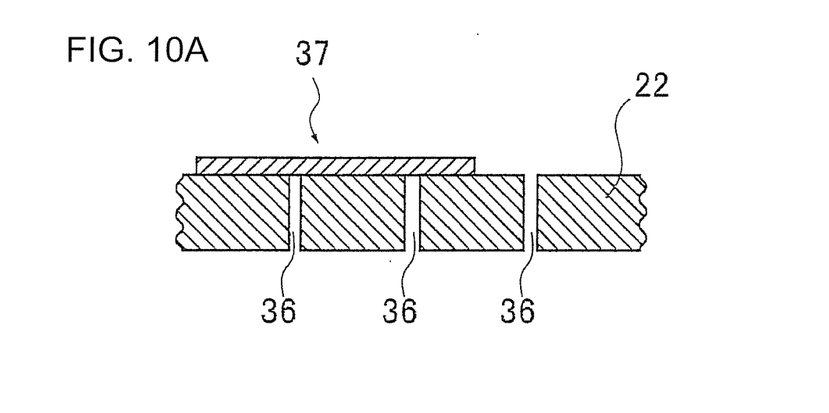
FIGS. 10A to 10C are drawings for explaining yet another example of the member for closing the through hole and used for the transmitting device.

FIG. 10A is a drawing which illustrates another modification of the member 37 in the second embodiment.

The member 37 is a sheet-like film. The film is stuck on the face of the housing 22 around the opening portion of the through hole 36. The member 37 may be an adhesive film.

Figure 10B:
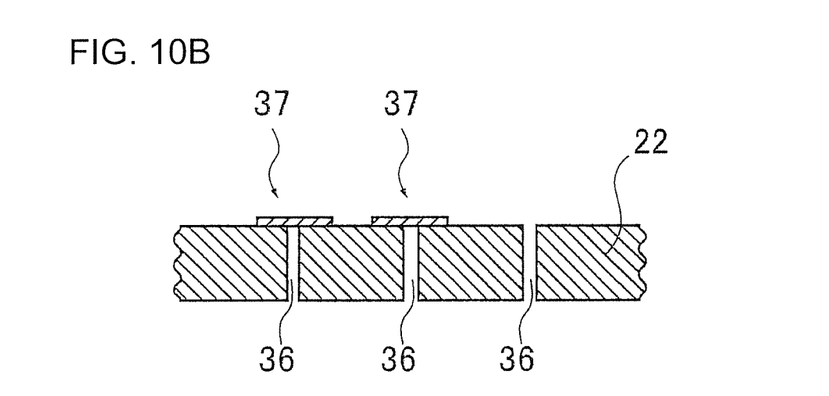
Figure 10C:
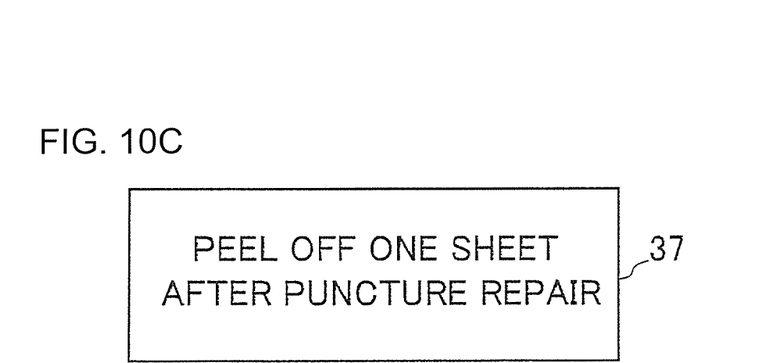

FIG. 10B is a drawing which illustrates another modification of the member 37.

The plurality of through holes 36 are formed in the housing 22. The members 37 are a plurality of sheet-like films and the plurality of films are separately stuck on the face of the housing 22 around the respective opening portions of the plurality of through holes 36. Each member 37 is preferably printed with an instruction such as "Peel off one sheet after puncture repair" that encourages removal of the member 37. Even if the communicating through hole 36 is closed with the puncture repair agent and brought into the non-communicating state, a worker can dismount the tire off the rim, see the instruction on the member 37, and peel off the member 37 to thereby easily bring the non-communicating through hole 36 into the communicating state.

Figure 11A:
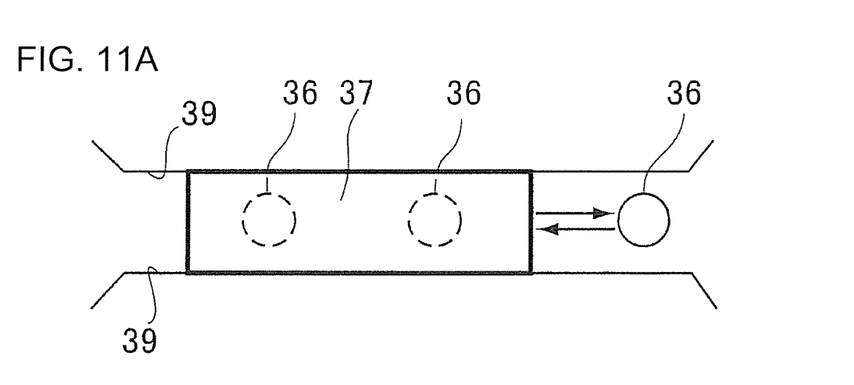
FIGS. 11A and 11B are drawings for explaining yet another example of the member for closing the through hole and used for the transmitting device.

FIG. 11A is a drawing which illustrates another modification of the member 37 in the second embodiment.

The member 37 is a rectangular plate member for sliding within a predetermined region on the face of the housing 22. The through holes 36 are closed with the plate member to interrupt communication between the tire cavity area and the inner space 38 in the housing 22. The member 37 (the member illustrated in a thick line in the drawing) which is the plate member is engaged with groove portions 39. The groove portions 39 are formed on the surface of the housing 22, corresponding to both side portions in a width direction of the member 37 and can freely slide in a left-right direction in the drawing.

Therefore, even if the through hole 36 is closed with the puncture repair agent and brought into the non-communicating state, it is possible to easily bring another non-communicating through hole 36 into the communicating state by dismounting the tire off the rim and sliding the member 37.

Figure 11B:
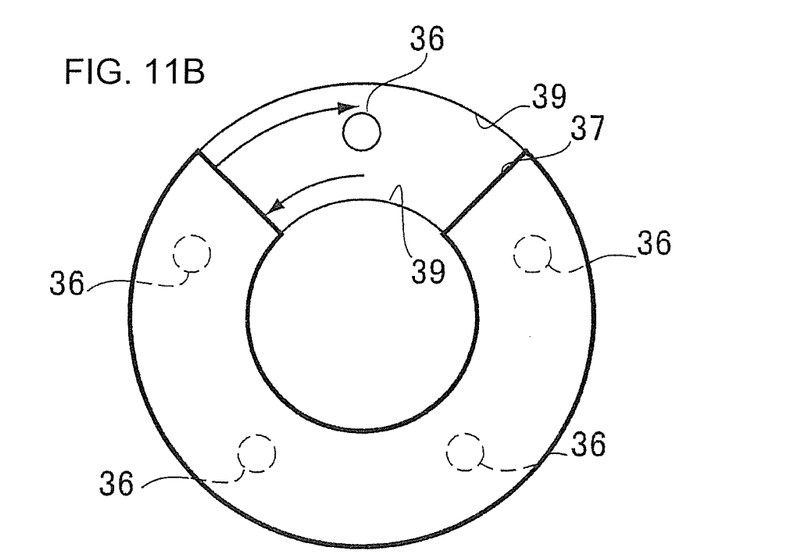

FIG. 11B is a drawing which illustrates another modification of the member 37 in the second embodiment.

The member 37 is a ring-shaped plate member which slides on a predetermined region of the face of the housing 22. The through holes 36 are arranged in a circular pattern corresponding to the ring shape of the member 37. The through holes 36 are closed with the member 37 to interrupt communication between the tire cavity area and the inner space 38 in the housing 22. The member 37 which is a plate member is notched on a part of a circumference of the ring shape and at least one through hole 36 positioned at the notched portion is in a communicating state.

The member 37 is engaged with the groove portions 39 provided to correspond to an outer peripheral portion and an inner peripheral portion of the ring-shaped member 37 and can freely slide in the circumferential direction in the drawing. Therefore, even if the through hole 36 is closed with the puncture repair agent and brought into a non-communicating state, a worker will dismount the tire off the rim and can slide the member 37 in the circumferential direction of the ring shape to thereby easily bring one of the non-communicating through holes 36 into a communicating state.

Figure 12A:
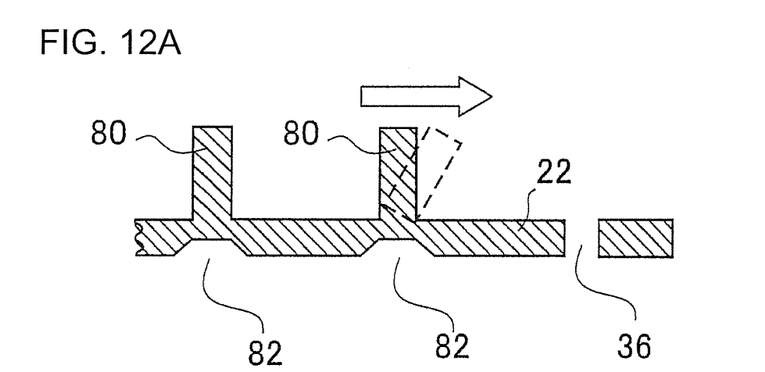
FIGS. 12A and 12B are drawings for explaining an example of a mechanism for forming the through hole in the transmitting device.
Figure 12B:
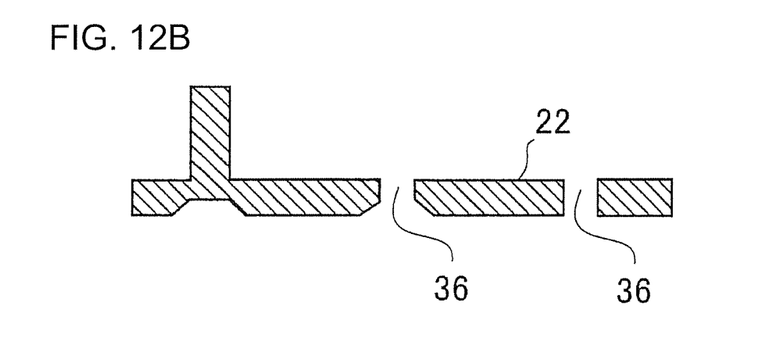

FIGS. 12A and 12B are drawings which illustrates yet another embodiment (a third embodiment) of the through hole 36 in the transmitting device 16.

The housing 22 is provided with at least one through hole 36 passing through the wall of the housing 22 to communicate between the inner space 38 in the housing 22 and the tire cavity area as illustrated in FIG. 12A. Furthermore, the housing 22 has protrusions 80 protruding from the face of the housing 22 and recessed portions 82 formed in a position corresponding to the positions of the protrusions 80 on an opposite side (on a side of the inner space 38) of the wall of the housing 22 from the protrusions 80. The wall portions of the housing 22 in the positions of the recessed portions 82 are formed as thin-walled portions having smaller wall thickness than the portion around them.

By breaking off the protrusion 80 as illustrated in FIG. 12A, the through hole 36 is formed in the position of the recessed portion 82. In other words, the wall between a bottom portion of the protrusion 80 and a bottom face of the recessed portion 82 is thin and the thin-walled portion of the wall of the housing 22 is removed simultaneously with the protrusion 80 when the protrusion 80 is broken off to thereby form the through hole 36 as illustrated in FIG. 12B.

Even if at least one through hole 36 in the communicating state is closed with the puncture repair agent and brought into the non-communicating state, a worker will dismount the tire off the rim and break off the protrusion 80 to thereby easily form a new communicating through hole 36. Such a mechanism for forming the through hole by using the protrusion 80 and the recessed portion 82 can be added to the transmitting device 16 in the first embodiment and the second embodiment and their modifications described above.

Regions around the opening portions of all the through holes 36 in the first embodiment and the second embodiment and their modifications and the third embodiment are preferably water-repellent faces. Even if the puncture repair agent spatters on the water-repellent face, liquid drops of the spattered puncture repair agent are easily repelled from the water-repellent face and therefore it is highly unlikely that the puncture repair agent adheres to the opening portion of the through hole 36 and solidifies. As material of the water-repellent face, silicon-based resin, fluorine-based resin, a modified resin obtained by grafting an organosilyl group or a fluoroalkyl group, or the like is used, for example. The region around the opening portion of the through hole 36 may be provided with microscopic asperities that exert water repellency.

Moreover, the opening area of the opening portion of the through hole 36 is preferably 0.4 $mm^2$ or smaller. When the opening area of the opening portion is 0.4 $mm^2$ or smaller, the puncture repair agent is highly unlike to enter the through hole 36 due to the action of the surface tension even if the puncture repair agent adheres to the opening portion of the through hole 36.

Although the transmission device and the tire condition monitoring system according to the invention have been described above in detail, the transmission device and the tire condition monitoring system according to the invention are not limited to the embodiments described above but may be improved or modified in various ways without departing from the gist of the invention.

The invention claimed is:

1. A transmitting device provided in a tire cavity area to transmit tire information about a condition of a tire, the transmitting device comprising:
   a sensor configured to detect, as the tire information, a condition of gas filled in the tire cavity area surrounded with the tire and a rim;
   a transmitter configured to wirelessly transmit the detected tire information; and a housing which has a wall surrounding the sensor and the transmitter, such that an inner space is separated from the tire cavity area by the wall, the housing defining a plurality of through holes passing through the wall, the through holes including a communicating through hole which enables communication between the tire cavity area and the inner space in the housing and a selectively non-communicating through hole having a member which is movable between a blocking position which impedes communication between the tire cavity area and the inner space in the housing through the selectively non-communicating through hole and an unblocking position which enables communication between the tire cavity area and the inner space in the housing through the selectively non-communicating through hole.

2. The transmitting device according to claim 1, wherein the member includes an end portion that protrudes from the selectively non-communicating through hole when the member is in the blocking position, and the end portion is provided with an assist handle configured to assist in movement of the member between the blocking position and the unblocking position.

3. The transmitting device according to claim 2, wherein the member includes an external screw configured to engage an internal thread formed in the selectively non-communicating through hole.

4. The transmitting device according to claim 2, wherein the housing includes a removable protrusion which protrudes from a face of the housing and a thin-walled portion which is formed at a position corresponding to a position of the protrusion on an opposite side of the wall of the housing from the protrusion and has a smaller wall thickness than a portion around the thin-walled portion, such that a new through hole is formed at the position of the thin-walled portion by removing the protrusion.

5. The transmitting device according to claim 2, wherein the housing has a plurality of faces oriented in different directions from each other in the tire cavity area; and opening portions of the through holes facing the tire cavity area are formed in the plurality of faces of the housing.

6. The transmitting device according to claim 2, wherein only one of the through holes is a communicating through hole.

7. The transmitting device according to claim 1, wherein the member includes an external screw configured to engage an internal thread formed in the selectively non-communicating through hole.

8. The transmitting device according to claim 1, wherein the member includes a film that removably attaches to a face of the housing around an opening portion of the selectively non-communicating through hole when the member is in the blocking position.

9. The transmitting device according to claim 1, wherein the housing includes a plurality of additional selectively non-communicating through holes and a plurality of additional members, each of the members including a respective film that selectively attaches to the housing around each respective opening portion of a respective one of the plurality of additional selectively non-communicating through holes.

10. The transmitting device according to claim 1, wherein the member includes a plate member configured to slide along a predetermined area on a face of the housing.

11. The transmitting device according to claim 1, wherein the housing includes a removable protrusion which protrudes from a face of the housing and a thin-walled portion which is formed at a position corresponding to a position of the protrusion on an opposite side of the wall of the housing from the protrusion and has a smaller wall thickness than a portion around the thin-walled portion, such that a new through hole is formed at the position of the thin-walled portion by removing the protrusion.

12. The transmitting device according to claim 1, wherein the housing has a plurality of faces oriented in different directions from each other in the tire cavity area; and opening portions of the through holes facing the tire cavity area are formed in the plurality of faces of the housing.

13. The transmitting device according to claim 1, wherein only one of the through holes is a communicating through hole.

14. The transmitting device according to claim 1, wherein an opening area of each opening portion of the through holes is 0.4 mm$^2$ or smaller.

15. The transmitting device according to claim 1, wherein an area around each opening portion of the through holes is a water-repellent face of the housing.

16. A transmitting device provided in a tire cavity area to transmit tire information about a condition of a tire, the transmitting device comprising:
a sensor configured to detect, as the tire information, a condition of gas filled in the tire cavity area surrounded with the tire and a rim;
a transmitter configured to wirelessly transmit the detected tire information; and
a housing which has a wall surrounding the sensor and the transmitter, such that an inner space is separated from the tire cavity area by the wall, the housing defining at least one through hole passing through the wall of the housing to communicatively connect the inner space and the tire cavity area, and the housing further including a removable protrusion which protrudes from a face of the housing and a thin-walled portion which is formed in a position corresponding to a position of the protrusion on an opposite side of the wall of the housing from the protrusion and has a smaller wall thickness than a portion around the thin-walled portion, such that a new through hole is formed at the position of the thin-walled portion by removing the protrusion.

17. The transmitting device according to claim 1, wherein an opening area of an opening portion of the through hole is 0.4 mm$^2$ or smaller.

18. The transmitting device according to claim 16, wherein an area around an opening portion of the through hole is a water-repellent face of the housing.

19. A tire condition monitoring system comprising:
a transmitting device including:
    a sensor configured to detect, as tire information, a condition of gas filled in the tire cavity area surrounded with a tire and a rim;
    a transmitter configured to wirelessly transmit the detected tire information; and
    a housing which has a wall surrounding the sensor and the transmitter, such that an inner space is separated from the tire cavity area by the wall, the housing defining a plurality of through holes passing through the wall, the through holes including a communicating through hole which enables communication between the tire cavity area and the inner space in the housing and a selectively non-communicating through hole having a member which is movable between a blocking position which impedes communication between the tire cavity area and the inner space in the housing through the selectively non-communicating through hole and an unblocking position which enables communication between the tire cavity area and the inner space in the housing through the selectively non-communicating through hole;

a receiving device configured to receive the tire information transmitted from the transmitter; and a monitoring section configured to determine whether a tire anomaly exists based on the tire information and provide a determination result.

20. A tire condition monitoring system comprising:

a transmitting device including:
- a sensor configured to detect, as tire information, a condition of gas filled in the tire cavity area surrounded with a tire and a rim;
- a transmitter configured to wirelessly transmit the detected tire information; and
- a housing which has a wall surrounding the sensor and the transmitter, such that an inner space is separated from the tire cavity area by the wall, the housing defining at least one through hole passing through the wall of the housing to communicatively connect the inner space and the tire cavity area and the housing further including a removable protrusion which protrudes from a face of the housing and a thin-walled portion which is formed in a position corresponding to a position of the protrusion on an opposite side of the wall of the housing from the protrusion and has a smaller wall thickness than a portion around the thin-walled portion, such that a new through hole is formed at the position of the thin-walled portion by removing the protrusion from the face of the housing;

a receiving device configured to receive the tire information transmitted from the transmitter; and a monitoring section configured to determine whether tire anomaly exists based on the tire information and provide a determination result.

* * * * *